(12) United States Patent
Armstrong et al.

(10) Patent No.: US 6,578,186 B1
(45) Date of Patent: Jun. 10, 2003

(54) RESET CONTROL FOR SYSTEMS USING PROGRAMMABLE LOGIC

(75) Inventors: Michael Armstrong, Sunnyvale, CA (US); Ashok Krishnamurthi, San Jose, CA (US)

(73) Assignee: Juniper Networks, Sunnyvale, CA (US)

( * ) Notice: Subject to any disclaimer, the term of this patent is extended or adjusted under 35 U.S.C. 154(b) by 224 days.

(21) Appl. No.: 09/742,538

(22) Filed: Dec. 22, 2000

(51) Int. Cl.$^7$ .................. G06F 17/50; G06F 7/38; H03K 17/693; H03K 19/00; H03K 19/173
(52) U.S. Cl. .................. 716/16; 326/38; 716/17
(58) Field of Search ................. 716/16; 326/38

(56) References Cited

U.S. PATENT DOCUMENTS

| | | |
|---|---|---|
| 6,049,222 A | 4/2000 | Lawman |
| 6,150,839 A | 11/2000 | New et al. |
| 6,308,311 B1 * | 10/2001 | Carmichael et al. .......... 716/16 |
| 6,438,737 B1 * | 8/2002 | Morelli et al. ............... 716/16 |
| 6,487,618 B1 * | 11/2002 | Theron et al. ............. 710/105 |

\* cited by examiner

*Primary Examiner*—Matthew Smith
*Assistant Examiner*—A. M. Thompson
(74) *Attorney, Agent, or Firm*—Harrity & Snyder, LLP

(57) ABSTRACT

A system prevents processor faults during the configuring of a programmable device. The system sets the processor into a reset mode, configures the programmable device using first configuration data, and determines whether the configuring using the first configuration data is successful. When the programmable device is not successfully configured, the system configures the programmable device using second configuration data and determines whether the configuring using the second configuration data is successful. The system releases the processor from the reset mode when the programmable device is successfully configured using the first or second configuration data or when the configuration of the programmable device using the second configuration data fails.

18 Claims, 5 Drawing Sheets

RESET CONTROL FOR SYSTEMS USING PROGRAMMABLE LOGIC

BACKGROUND OF THE INVENTION

A. Field of the Invention

The present invention relates generally to programmable devices and, more particularly, to systems and methods for configuring programmable devices.

B. Description of Related Art

Systems often use programmable logic devices that require configuration. Before the device is configured, it cannot perform its intended function. If a processor accesses resources in this logic device before it has been fully configured, the processor access may fail. Many problems can occur if this happens.

Conventional systems typically wait some period of time to allow the programmable logic device to fully configure. This technique, however, is difficult to implement correctly, and does not cover the case where the configuration of the logic device fails.

Therefore, there exists a need for systems and methods that improve logic device configuration.

SUMMARY OF THE INVENTION

Systems and methods, consistent with the present invention, address this and other needs by providing a configuration controller that holds a processor in a reset mode while a programmable device is being configured. The processor may determine the status/success of the configuration operation by accessing a configuration controller. This prevents the processor from accessing a non-configured programmable device.

In accordance with the purpose of the invention as embodied and broadly described herein, a method that configures a programmable device is disclosed. The method includes setting a processor into a reset mode, configuring the programmable device using first configuration data, and determining whether the configuring using the first configuration data is successful. When the configuring using the first configuration data is unsuccessful, the method configures the programmable device using second configuration data and determines whether the configuring using the second configuration data is successful. The method releases the processor from the reset mode when the programmable device is successfully configured using the first or second configuration data or when the configuring using the second configuration data fails.

In another implementation consistent with the present invention, a method that configures a programmable device is provided. The method includes receiving a configuration command from a processor, configuring the programmable device in response to receiving the configuration command, and setting a flag that indicates whether the programmable device is successfully configured. The flag allows for a configuration status of the programmable device to be determined without having to access the programmable device.

In yet another implementation consistent with the present invention, a network device includes a programmable device, a configuration controller, and a processor. The configuration controller receives a configuration command, configures the programmable device in response to receiving the configuration command, and sets a flag indicating the status of the configuring operation. The processor transmits the configuration command and verifies the status of the configuring by reading the flag set by the configuration controller.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, improve programmable device configuration by preventing a processor from accessing the programmable device during the configuration operation. The processor may read a configuration status flag from a location separate from the programmable device. This allows the processor to determine whether the configuration procedure is successful without having to access the programmable device thereby protecting the processor from accessing a programmable device that has not been configured properly.

EXEMPLARY ROUTER CONFIGURATION

Figure 1:
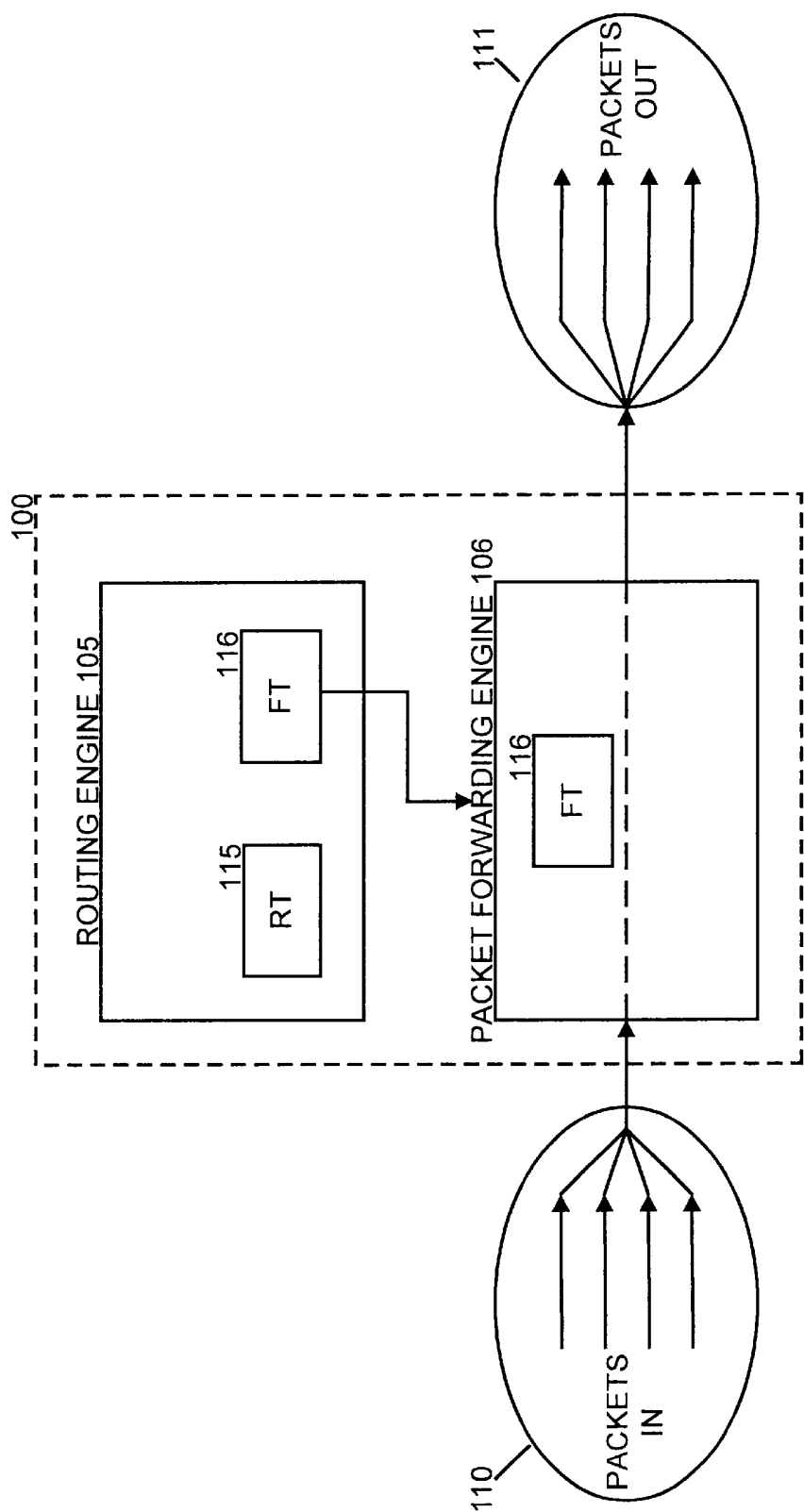
FIG. 1 illustrates an exemplary router configuration consistent with the present invention.

FIG. 1 illustrates an exemplary configuration of a router 100 consistent with the present invention. In general, router 100 receives incoming packets 110, determines the next destination (the next "hop" in the network) for the packets, and outputs the packets as outbound packets 111 on physical links that lead to the next destination. In this manner, packets "hop" from router to router in a network until reaching their final destination.

As illustrated, router 100 includes routing engine 105 and a packet forwarding engine (PFE) 106. Routing engine 105 may maintain one or more routing tables (RTs) 115 and a forwarding table (FT) 116. Through routing tables 115, routing engine 105 consolidates routing information that the routing engine learns from the routing protocols of the network. From this routing information, the routing protocol process may determine the active routes to network destinations and install these routes into forwarding table 116. Packet forwarding engine 106 may consult forwarding table 116 when determining the next destination for incoming packets 110.

EXEMPLARY SYSTEM

Figure 2:
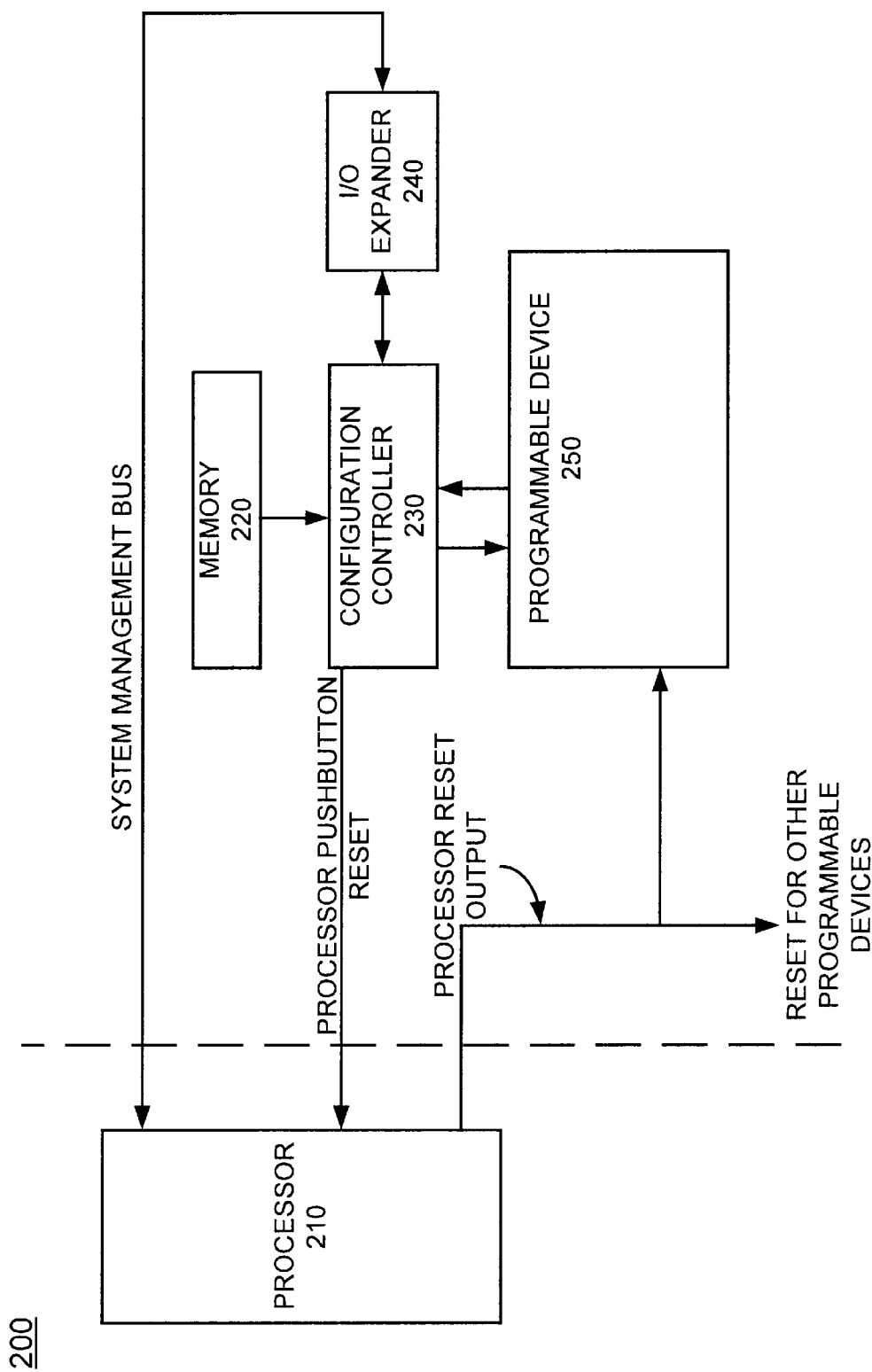
FIG. 2 illustrates an exemplary system in which systems and methods, consistent with the present invention, may be implemented.

FIG. 2 illustrates an exemplary system 200 in which systems and methods, consistent with the present invention, may be implemented. In one implementation consistent with the present invention, the system 200 may be included within the routing engine 105 or the packet forwarding engine 106 of the router 100. The system 200 may include a processor 210, a memory 220, a configuration controller 230, an input/output (I/O) expander 240, and a programmable device 250.

The processor 210 may include any type of conventional processor or microprocessor that interprets and executes instructions. The memory 220 may include one or more conventional memory devices capable of storing data for configuring the programmable device 250. In an implementation consistent with the present invention, the memory includes a flash memory or another type of memory device.

The configuration controller 230 may include one or more devices that provide the configuration data to the programmable device 250. In an implementation consistent with the present invention, the configuration controller 230 may be implemented as a complex programmable logic device (CPLD). As illustrated, the configuration controller 230 may connect to the processor 210 via a processor pushbutton reset bus.

The I/O expander 240 may include one or more conventional devices that allow the processor 210 to communicate with the configuration controller 230. In an implementation consistent with the present invention, the I/O expander 240 may be implemented as an 8-bit device with a two-wire serial interface. The I/O expander 240 may, for example, be connected to the processor 210 via a system management bus. As will be described in more detail below, the I/O expander 240 allows the processor 210 to read the status of a configuration procedure from the configuration controller 230 and to force a configuration operation.

The programmable device 250 may include one or more conventional programmable devices, possibly having input/output blocks (IOBs), configurable logic blocks (CLBs), and programmable interconnect (not shown). In an implementation consistent with the present invention, the programmable device 250 includes a field programmable gate array (FPGA).

Figure 3:
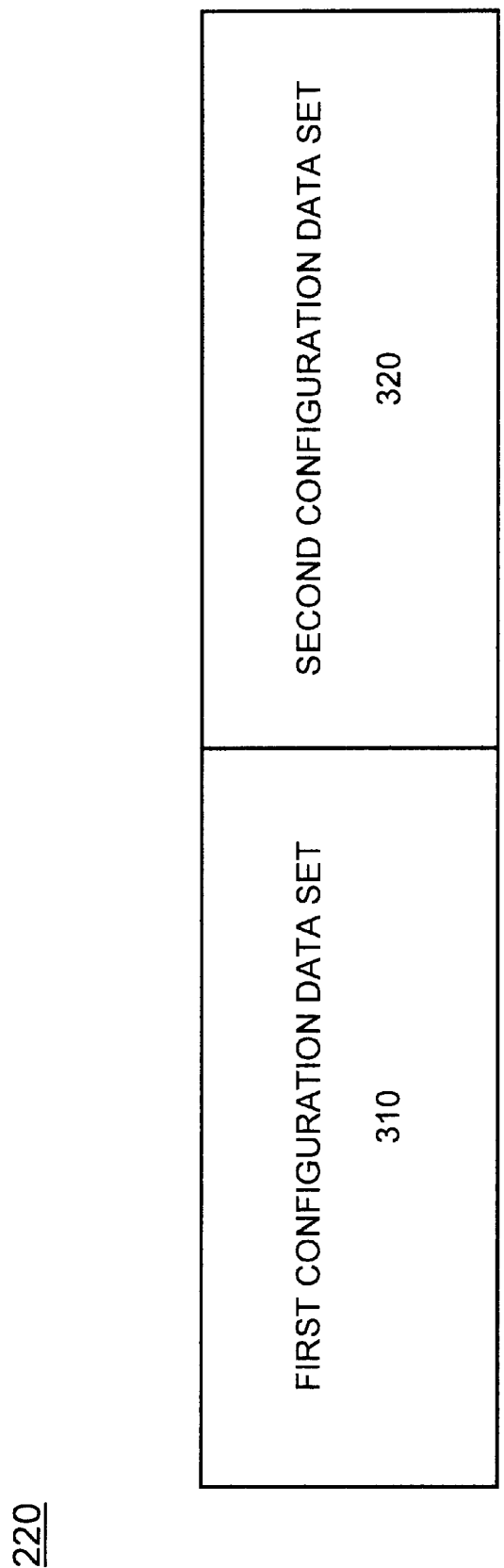
FIG. 3 illustrates an exemplary configuration of the memory of FIG. 2.

FIG. 3 illustrates an exemplary configuration of the memory 220 of FIG. 2. As illustrated, the memory 220 may include a first configuration data set 310 and a second configuration data set 320. The first configuration data set 310 may include data for configuring the programmable device 250. The second configuration data set 320 may include alternate data for configuring the programmable device 250. The configuration data may control the function and interconnection within the programmable device 250. As will be described in more detail below, the configuration controller 230 may attempt to configure the programmable device 250 using the first configuration data set 310. If the configuration procedure fails, the configuration controller 230 may automatically attempt to configure the programmable device 250 using the second configuration data set 320.

EXEMPLARY PROCESSING

Figure 4:
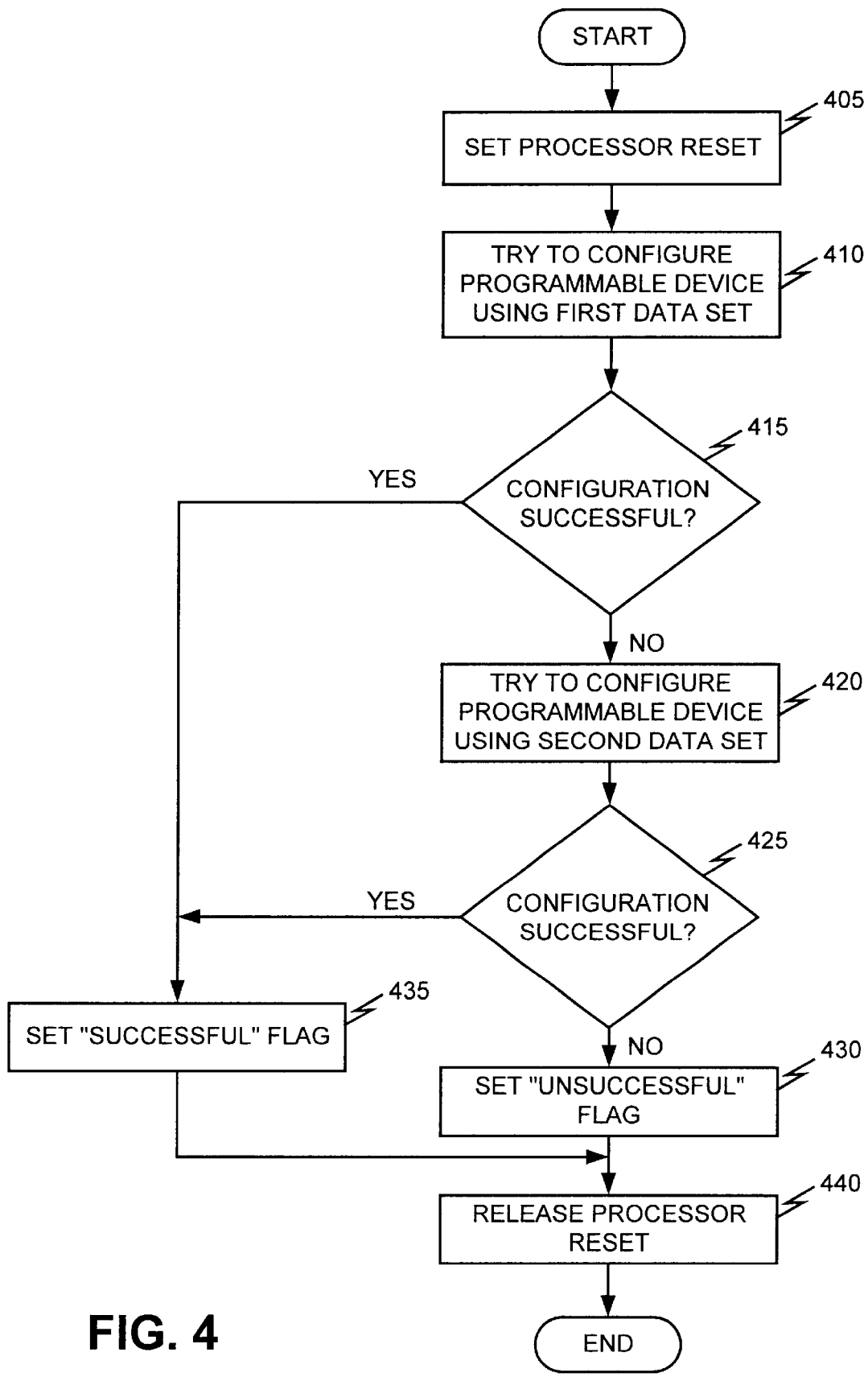
FIG. 4 illustrates an exemplary process, consistent with the present invention, for configuring a programmable device.

FIG. 4 illustrates an exemplary process, consistent with the present invention, for configuring a programmable device, such as programmable device 250. Processing may begin with the configuration controller 230 setting the processor 210 into a reset mode [act 405]. To do so, the configuration controller 230 may transmit a reset signal via the processor pushbutton reset bus in FIG. 2. The configuration controller 230 may hold the processor 210 in the reset mode while the programmable device 250 is being configured. This prevents the processor 210 from attempting to access the programmable device 250 prior to the device 250 being fully configured.

The configuration controller 230 may then attempt to configure the programmable device 250 using the first configuration data set 310 from the memory 220 [act 410]. The configuration controller 230 may configure the programmable device 250 using any conventional technique. For example, the configuration controller 230 may configure the programmable, device 250 by providing the first configuration data set 310 to the IOBs, CLBs, and programmable interconnect of the programmable device 250.

The configuration controller 230 may determine whether configuration of the programmable device 250 was successful [act 415]. To make this determination, the configuration controller 230 may, for example, receive a signal from the programmable device 250 indicating that the configuration was successful. If configuration of the programmable device 250 using the first configuration data set 310 was unsuccessful, the configuration controller 230 may attempt to configure the programmable device 250 using the second configuration data set 320 [act 420]. The second configuration data set 320 may be the same as or similar to the first configuration data set 310.

The configuration controller 230 may determine whether the configuration of the programmable device 250 was successful using the second configuration data set 320 [act 425]. If the configuration operation was unsuccessful, the configuration controller 230 may set a flag indicative of such [act 430]. If the configuration controller 230 successfully configures the programmable device 250 using either the first configuration data set 310 or the second configuration data set 320, the configuration controller 230 may set a flag indicating that the programmable device 250 was successfully configured [act 435].

The configuration controller 230 may then release the processor 210 from the reset mode [act 440]. This allows the processor 210 to boot up irrespective of the success of the configuration operation.

The processor 210 may determine the status of the configuration operation by reading the configuration load status (i.e., the flag) from the configuration controller 230 through the I/O expander 240. Since the processor 210 may determine whether or not the configuring of the programmable device 250 was successful without having to access the programmable device 250, the processor 210 is protected, in the event that the configuration was unsuccessful, from accessing a non-configured programmable device 250. If the configuration operation was successful, the processor 210 may, as illustrated FIG. 2, reset the programmable device 250, and possibly other devices, via the processor reset output bus. The programmable device 250 may, for example, use this reset signal to reset other devices in the network, such as Ethernet switches.

Figure 5:
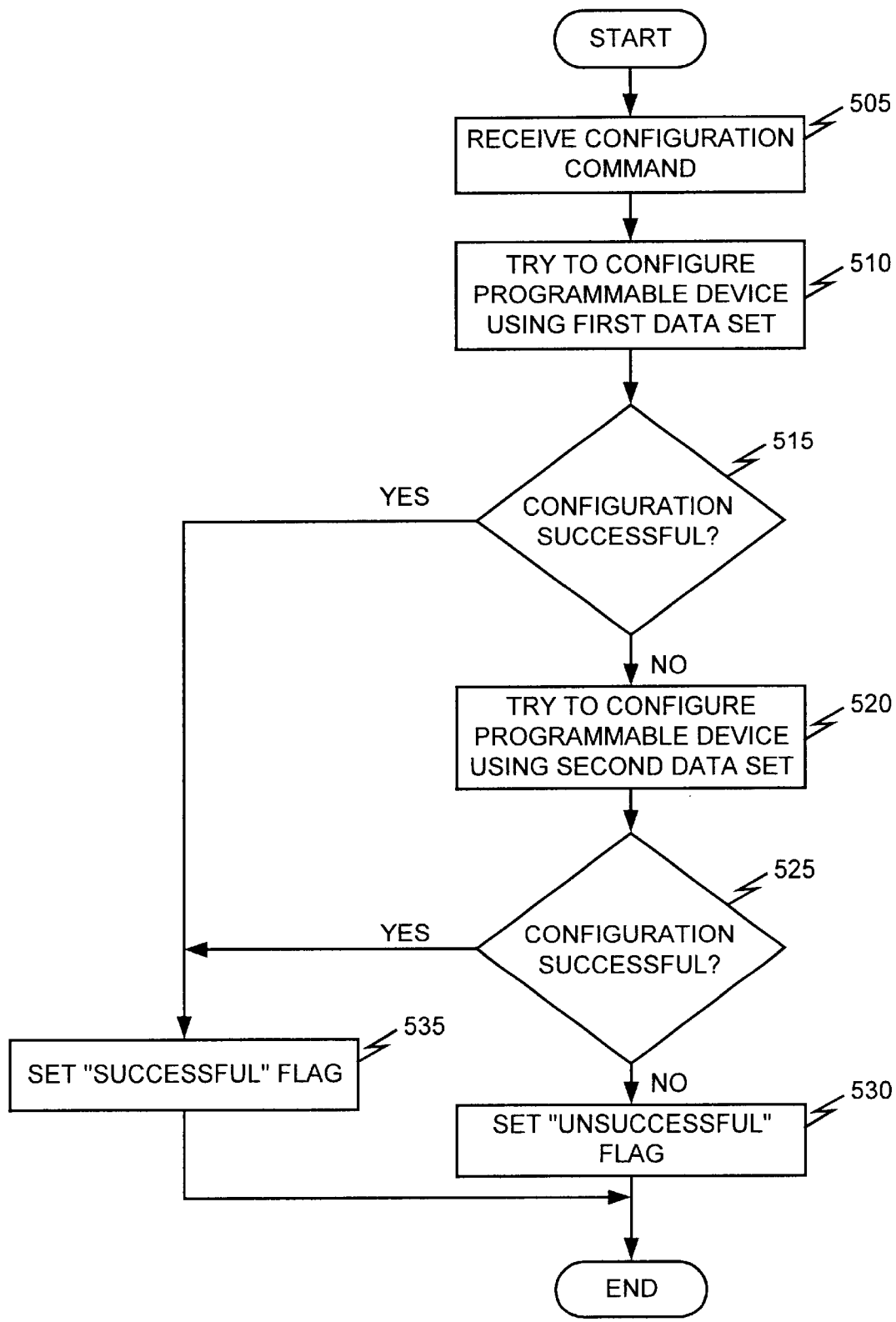
FIG. 5 illustrates an exemplary alternative process, consistent with the present invention, for configuring a programmable device.

FIG. 5 illustrates an exemplary alternative process, consistent with the present invention, for configuring a programmable device, such as programmable device 250. In this alternative process, the processor 210 may store one or more new configuration data sets in the memory 220 and force a configuration procedure using this new configuration data by sending a configuration command to the configuration controller 230.

Processing may begin with the configuration controller 230 receiving a configuration command from the processor 210 [act 505]. The configuration controller 230 may receive the configuration command through the I/O expander 240. In response to receiving the configuration command, the configuration controller 230 may attempt to configure the programmable device 250 using the new first configuration data set 310 from the memory 220 [act 510]. The configuration controller 230 may configure the programmable device 250 using any conventional technique. For example, the configuration controller 230 may configure the programmable device 250 by providing the first configuration data set 310 to the IOBs, CLBs, and programmable interconnect of the programmable device 250.

The configuration controller 230 may determine whether configuration of the programmable device 250 was successful [act 515]. To make this determination, the configuration controller 230 may, for example, receive a signal from the programmable device 250 indicating that the configuration was successful. If configuration of the programmable device 250 using the first configuration data set 310 was unsuccessful, the configuration controller 230 may attempt to configure the programmable device 250 using the new second configuration data set 320 [act 520]. The second configuration data set 320 may be the same as or similar to the first configuration data set 310.

The configuration controller 230 may determine whether the configuration of the programmable device 250 was successful using the second configuration data set 320 [act 525]. If the configuration operation was unsuccessful, the configuration controller 230 may set a flag indicative of such [act 530]. If the configuration controller 230 successfully configures the programmable device 250 using either the first configuration data set 310 or the second configuration data set 320, the configuration controller 230 may set a flag indicating that the programmable device 250 was successfully configured [act 535].

The processor 210 may verify the success of the configuration procedure by reading the flag in the configuration controller 230. As such, the processor 210 may determine if the programmable device 250 has configured properly without having to access the programmable device 250 itself. This protects the processor 210 from accessing a non-configured programmable device 250 in the event that the configuration procedure is unsuccessful.

CONCLUSION

Systems and methods, consistent with the present invention, improve the configuring of a programmable device. A configuration controller prevents a processor from accessing the programmable device during the configuration operation. After the configuration operation is complete, the processor may determine whether the configuration procedure is successful prior to accessing the programmable device. This protects the processor from accessing a non-configured programmable device.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been presented with respect to FIGS. 4 and 5, the order of the acts may be altered in other implementations consistent with the present invention. No element, act, or instruction used in the description of the present application should be construed as critical or essential to the invention unless explicitly described as such.

The scope of the invention is defined by the following claims and their equivalents.

What is claimed is:

1. A method for configuring a programmable device, comprising:
   setting a processor into a reset mode;
   configuring the programmable device using first configuration data;
   determining whether the configuring using the first configuration data is successful;
   configuring the programmable device using second configuration data when the configuring using the first configuration data is determined to be unsuccessful;
   determining whether the configuring using the second configuration data is successful; and
   releasing the processor from the reset mode when the programmable device is successfully configured using the first or second configuration data or when the configuring using the second configuration data fails.

2. The method of claim 1 further comprising:
   receiving, after releasing the processor, a configuration command from the processor;
   repeating the configuring of the programmable device using the first configuration data, determining whether the configuring using the first configuration data is successful, and configuring the programmable device using the second configuration data when the configuring using the first configuration data is determined to be unsuccessful.

3. The method of claim 1 further comprising:
   determining, via the processor, whether the programmable device is successfully configured without accessing the programmable device.

4. The method of claim 1 wherein the programmable device is a field programmable gate array.

5. A system that configures programmable devices, comprising:
   means for setting a processor into a reset mode;
   means for configuring a programmable device using first configuration data;
   means for determining whether the configuring using the first configuration data is successful;
   means for configuring the programmable device using second configuration data when the configuring using the first configuration data is determined to be unsuccessful;
   means for determining whether the configuring using the second configuration data is successful; and
   means for releasing the processor from the reset mode when the programmable device is successfully configured using the first or second configuration data or when the configuring using the second configuration data is unsuccessful.

6. A system for configuring a programmable device, comprising:
   a memory configured to store at least a first data set and a second data set; and
   a configuration controller configured to configure the programmable device using the first data set, determine whether the programmable device is successfully configured using the first data set, and configure the programmable device using the second data set when the configuring using the first data set is unsuccessful.

7. The system of claim 6 wherein the programmable device is a field programmable gate array.

8. The system of claim 6 wherein the configuration controller is further configured to:

set a processor into a reset mode prior to configuring the programmable device using the first data set, and release the processor from the reset mode when the configuring using the second data set is unsuccessful or when the configuring using the first or second data set is successful.

9. The system of claim 8 further comprising:

an input/output expander configured to provide an indication of whether the programmable device is successfully configured to a processor.

10. The system of claim 6 wherein the configuration controller is further configured to:

set a flag indicating whether the programmable device is successfully configured.

11. A method for configuring a programmable device, comprising:

receiving a configuration command from a processor;

configuring the programmable device in response to receiving the configuration command; and verifying, via the processor, that the programmable device is successfully configured without accessing the programmable device.

12. The method of claim 11 wherein the configuring includes:

configuring the programmable device using first configuration data, determining whether the configuring using the first configuration data is successful, and configuring the programmable device using second configuration data when the configuring using the first configuration data is determined to be unsuccessful.

13. The method of claim 11 further comprising:

setting a flag to indicate whether the programmable device is successfully configured at a location external to the programmable device.

14. The method of claim 13 wherein the verifying includes:

reading the flag.

15. A system for configuring a programmable device, comprising:

a configuration controller configured to receive a configuration command, configure the programmable device in response to receiving the configuration command, and set a flag indicating whether the programmable device is successfully configured; and a processor configured to transmit the configuration command to the configuration controller and verify that the programmable device is successfully configured by reading the flag set by the configuration controller.

16. The system of claim 15 wherein, when configuring the programmable device, the configuration controller is configured to:

configure the programmable device using first configuration data, determine whether the configuring using the first configuration data is successful, and configure the programmable device using second configuration data when the configuring using the first configuration data is determined to be unsuccessful.

17. A method for configuring a programmable device, comprising:

configuring the programmable device using first configuration data;

determining whether the configuring using the first configuration data is successful; and configuring the programmable device using second configuration data when the configuring using the first configuration data is determined to be unsuccessful.

18. A network device comprising:

a programmable device;

a configuration controller configured to receive a configuration command, configure the programmable device in response to receiving the configuration command, and set a flag indicating the status of the configuring; and a processor configured to transmit the configuration command and verify the status of the configuring by reading the flag set by the configuration controller.

* * * * *